Oct. 28, 1958      E. G. K. SCHWARZ      2,858,459
SECONDARY EMISSION TYPE OF NUCLEAR BATTERY
Filed June 2, 1954

INVENTOR.
ERICH GUSTAV KARL SCHWARZ
BY
*Harry M. Saragovitz*
ATTORNEY

2,858,459
SECONDARY EMISSION TYPE OF NUCLEAR BATTERY

Erich G. K. Schwarz, Eatontown, N. J., assignor to the United States of America as represented by the Secretary of the Army Application June 2, 1954, Serial No. 434,095

8 Claims. (Cl. 310—3)

(Granted under Title 35, U. S. Code (1952), sec. 266)

The invention described herein may be manufactured and used by or for the Government for governmental purposes without the payment of any royalty thereon.

This invention relates to nuclear batteries and more particularly to batteries utilizing fission products as well as neutron-activated isotopes of a reasonable half-life which deliver negative beta-particles, that is, free electrons of high speed.

A nuclear battery of this type comprises, within a highly evacuated container, a solid beta emitter emitting negatively charged electrons and thereby acquiring a positive charge itself, and a collector which is hit by the electrons thereby charging the collector negatively. An electric field is thus being built up between emitter and collector.

In nuclear batteries of this type secondary electron emission presents a serious problem. Whenever fast electrons impinge on matter they free slow electrons and leave positively charged atoms or molecules. This process of freeing slow electrons from a solid matter is called secondary emission. The secondary electrons because of their slow speed tend to be drawn back and to recombine with the positive charge on the emitter or they drift around without contributing anything to the electric charge of the collector.

It is an object of this invention to utilize the secondary emission to increase the battery current. This is achieved by a cell construction in which a solid primary emitter of beta-particles is fixed in a highly evacuated metal container (the collector) that completely surrounds the emitter. The primary emitter is covered by a dielectric insulating layer of radiation resistant material (the absorber) that slows down the emitted beta-particles and matches their energy to an optimum for secondary beta production while preventing the drift of the secondary electrons back to the source. This absorber in turn is covered with a very thin secondary emitting film which is in electrical contact with the emitter. The central part (primary emitter, absorber, and secondary emitter) is connected to the positive terminal leading through the collector with the aid of a vacuum-tight insulator. The collector, surrounded by a radiation shield, constitutes the negative terminal.

The invention will become more apparent from the following description of a specific embodiment of the inventive concept as illustrated in the accompanying drawing in which—

Figure 1:
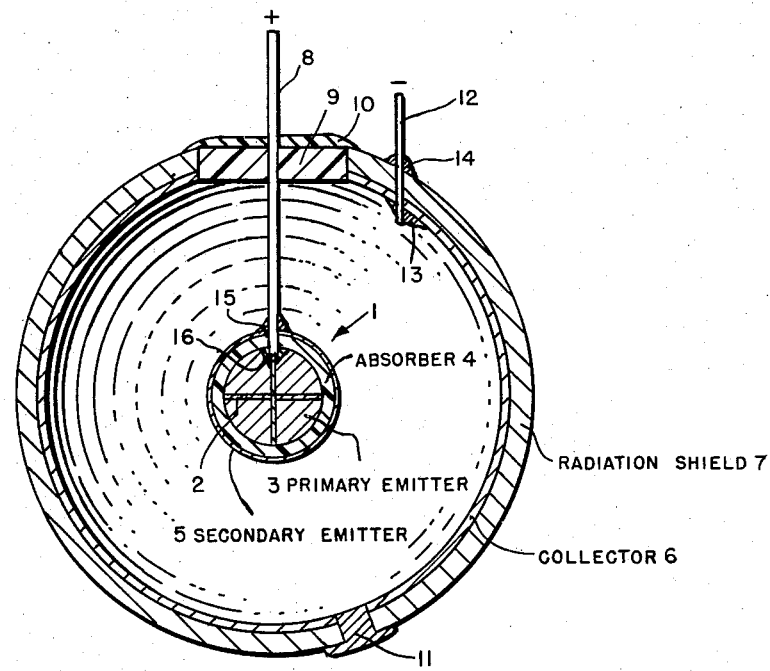
Figure 2:
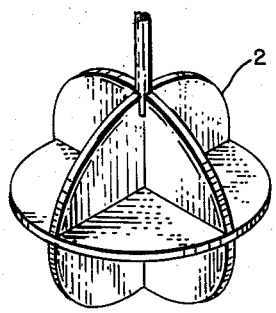

Fig. 1 is a nuclear battery according to the invention in cross-sectional elevation, and Fig. 2 is a perspective view of the grid for the primary emitter.

The nuclear battery according to the invention consists of a positive electrode 1 which comprises a grid 2 for holding the solid primary radiation emitter 3 consisting, for instance, of strontium 90 in equilibrium with its daughter yttrium 90, or of tritiated zirconium or other beta emitters produced by artificial transmutation, as, for instance, nuclear fission, nuclear fusion, or nuclear bombardment. These beta emitting materials are preferably mixed with a carrier salt, as, for instance, a salt of barium or inactive strontium and the mixture, with or without an appropriate binder (e. g., a natural or artificial lacquer), is pasted into the grid 2 and then dried to drive off all moisture and the volatile solvent of the binder.

The pasted grid is surrounded by a radiation absorbing layer 4 consisting preferably of polystyrene which appears to be best suited for slowing down the high velocity electrons. Other synthetic resinous materials such as chlorinated or fluorinated vinyl polymers (known under such trade names as Teflon, Kel-F, etc.) which are resistant to the radiation of the primary emitter may also be used. The absorber 4 of insulating materials is surrounded by a second layer 5 of a secondary emitter consisting of a material with a high secondary emission ratio.

The two separate functions of the absorber 4 and the secondary emitter 5 may be performed by a single layer of a material having metallic or semiconducting properties. The bulk of such a single layer then acts as a radiation absorber while the outermost surface of this single layer acts as the secondary emitter. Oxides of magnesium or of copper or metallic platinum, or combinations of these materials with plastic carriers lend themselves to the manufacture of such a combination of absorber and secondary emitter. A suitable combination may, for instance, consist of a plastic carrier covering the primary emitter and carrying on its outer surface a thin film of metallic platinum.

Secondary emission electrodes having high emission ratios are well known in the art; they may consist, for instance, of magnesium oxide, barium oxide, lithium fluoride, sodium fluoride, sodium chloride, potassium chloride. Preferably, more complex secondary emitters known in the art may be used such as, for instance, the emitter indicated by the formulas [Ag]—$Cs_2O$, Ag—Cs. An emitter of this formula consists of a carrier plate of silver, the surface of which is oxidized by means of an electrical discharge (bombardment with oxygen ions) in an appropriate discharge vessel. Onto this oxidized silver surface, metallic caesium (Cs) is deposited by means of high vacuum evaporation preferably in the same discharge vessel whereby the caesium is totally absorbed by the silver oxide layer. By heating this electrode within the vessel to 250° C. atomic silver is freed and caesium oxide ($CsO_2$) is formed on the surface of the plate leading to a very thin coat of caesium oxide and silver atoms. An excess of caesium is necessary so that metallic caesium is adsorbed on the uppermost surface of the plate. The current multiplication factors of the best known secondary emitting surfaces are well in the range of about 10.

The grid 2 carrying the primary emitter 3, the absorber 4, and the secondary emitter 5 may consist of a very thin but stiff metal foil of nickel, Kovar, or other metals or metal alloys inert to the influence of radiation. The grid 2 may have any suitable shape that will assist in securely retaining the primary emitter 3 without interfering with its radiation.

The positive electrode 1 is positioned in the center of a highly evacuated spherical collector 6 covered by a radiation shield 7. The positive electrode 1 is held in its place by a rod 8 led through a vacuum-tight insulating material 9. The rod 8 consists, preferably of Kovar and the insulating material 9 of glass covered by a potting compound 10. The collector 6 may consist of an electrically conductive material of low atomic number to keep the production of Bremsstrahlung as low as possible. Suitable materials are, for instance, aluminum, graphite, conductive plastics, or combinations of these materials. The radiation shield preferably consists of lead, stainless steel, or combinations of both. The collector 6 and the shield 7 are provided with an opening for evacuation which opening is sealed after the necessary high vacuum has been obtained by a stopper 11 preferably made from glass or polystyrene.

The rod 8 constitutes the positive terminal while another rod 12 electrically connected with collector 6 and radiation shield 7 constitutes the negative electrode. To insure mechanical rigidity and high vacuum within the collector the rod 12 is soldered or welded to both the collector 6 and the radiation shield 7 by suitable materials as indicated in the drawing at 13 and 14 respectively. The rod 8 is similarly secured to the grid 2, the absorber 4 and the secondary emitter 5 as indicated at 15 and 16.

The electrode 1 consisting of primary emitter 3, absorber 4, and secondary emitter 5 does not have to comprise a grid. Using appropriate binders the primary emitter material may be pasted around the inner end of the rod 8 in such a manner that after drying a mechanically secured bond is achieved. In any case, it is of course necessary that the rod 8 constituting the positive terminal is electrically connected to the secondary emitter 5.

The secondary emission type nuclear battery according to the invention can be modified by making the outer and inner terminal and also the secondary emitter of materials with widely different work functions, providing an additional charge collecting potential, in which case the outer terminal (collector) has to have the lowest work function (positive in respect to the other electrodes), thus attracting the negative beta particles.

What is claimed is:

1. A nuclear battery cell comprising a highly evacuated spherical radiation collector constituting the cell container, a radiation shield enveloping said collector, a solid primary beta emitter held within the spherical collector by a terminal rod, a secondary emitter provided between said primary emitter and said collector and a radiation absorber provided between said primary and said secondary emitter, said terminal rod being in electrical contact with both the primary and the secondary emitter and being led through the collector by an insulating, vacuum-tight seal.

2. A nuclear battery according to claim 1 in which the radiation absorber consists of polystyrene.

3. A nuclear battery cell according to claim 1 in which the primary beta emitter, the secondary emitter and the collector consists of materials with widely different work functions, the collector having the lowest and the secondary emitter having the highest work function.

4. A nuclear battery cell according to claim 1 in which a combined radiation absorber and secondary emitter is provided between the primary emitter and the collector, said combined radiation absorber and secondary emitter comprising a material selected from the group consisting of the oxides of copper, the oxides of magnesium and metallic platinum.

5. A nuclear battery according to claim 4 in which the combined radiation absorber and secondary emitter comprises a plastic layer the surface of which is covered with an extremely thin film of platinum.

6. A nuclear battery cell comprising a highly evacuated spherical radiation collector constituting the cell container, a radiation shield enveloping said collector, a spherical solid primary beta emitter held within the center of the spherical collector by a terminal rod, a first layer of radiation absorbent material covering said spherical primary emitter, a second layer of a secondary emitter material covering said first layer, said terminal rod being in electrical contact with both the primary and the secondary emitter and being led through the collector and the radiation shield by an insulating, vacuum-tight seal.

7. A nuclear battery cell according to claim 6 in which the inner end of said terminal rod carries a grid for the solid primary emitter.

8. A nuclear battery cell according to claim 7 in which said primary emitter comprises a beta radiation emitting material in mixture with a carrier salt and a binder, said radiation material being selected from the group consisting of strontium 90 in equilibrium with its daughter yttrium 90, and tritiated zirconium.

References Cited in the file of this patent

UNITED STATES PATENTS

| | | |
|---|---|---|
| 2,164,892 | Banks | July 4, 1939 |
| 2,527,945 | Linder | Oct. 31, 1950 |
| 2,552,050 | Linder | May 8, 1951 |